Nov. 27, 1934.  B. KING  1,981,866
CARBON CUTTING DEVICE
Filed May 12, 1934
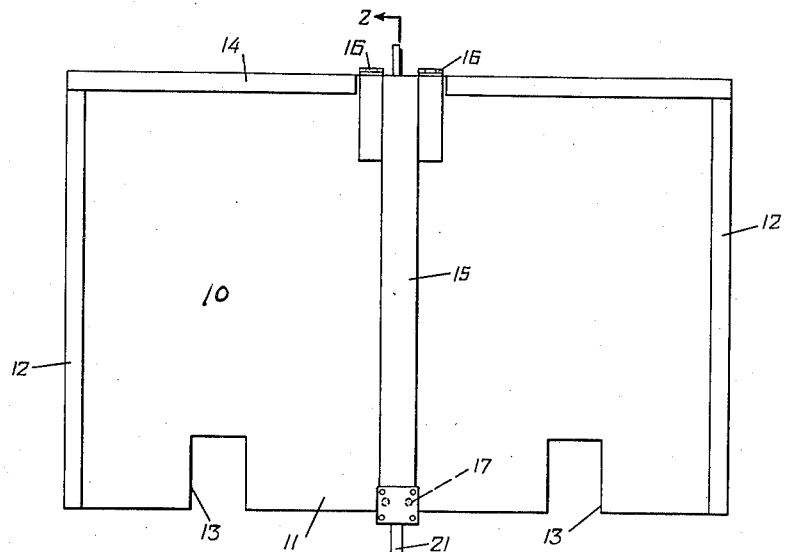
Fig. 1
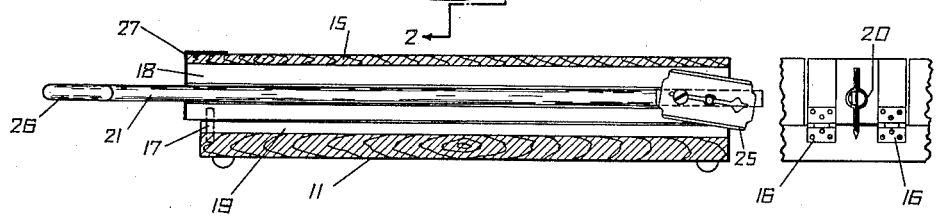
Fig. 2
Fig. 3
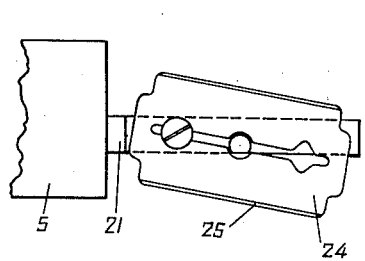
Fig. 4
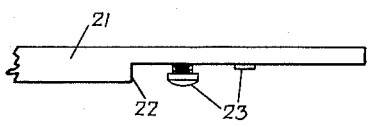
Fig. 5
INVENTOR
*BERNARD KING*
BY
ATTORNEY Patented Nov. 27, 1934

1,981,866

UNITED STATES PATENT OFFICE 1,981,866

CARBON CUTTING DEVICE

Bernard King, United States Navy

Application May 12, 1934, Serial No. 725,289

2 Claims. (Cl. 164—73)

(Granted under the act of March 3, 1883, as amended April 30, 1928; 370 O. G. 757)

This invention relates to a paper cutter and has for an object to provide an improved paper cutting device especially adapted for cutting in half papers of a predetermined size.

Another object of this invention is to provide an improved paper cutter adapted to quickly and easily halve a plurality of papers, such as communication blank carbons.

A further object of this invention is to provide a paper cutter having a pressure arm adapted to hold the papers in position on the holder as the paper is being cut.

A still further object of this invention is to provide a cutting device in a holding arm on a paper cutter, which cutting device will cut the paper while the holder continues to hold both portions of the cut paper.

In the drawing:

Fig. 1 shows a top plan view of the paper cutter;

Fig. 2 is a sectional view on lines 2—2 of Fig. 1;

Fig. 3 is an end view of the hinging means between the cutter and the holder;

Fig. 4 is an enlarged view of the end of the handle rod and cutting blade attached thereto;

Fig. 5 is a top plan view of the blade securing means on the end of the handle rod.

The paper cutter shown at 10, constituting this invention, consists of a table or holder 11 rectangular in shape, on three sides of which are secured framing members or ledges 12 and 14, and the fourth side of which is recessed as at 13 on opposite sides of the center thereof. A pressure arm or holding arm 15 is hinged as at 16 to the center of the side opposite the side having recesses 13, the ledge or frame 14 being omitted at this point to permit the hinges to be secured thereto. This pressure arm 15 may thus be hinged away from the table or folded across the same as shown, a pair of pins 17 on the opposite end of the arm 15 extending into suitable pin holes in the frame 11 for holding the arm more securely in place when in folded position.

Extending through the arm 15 is a slot 18 and a cooperating aligned slot 19 extends across the surface of the table 11 beneath the slot 18 of holder 15. An aperture 20 extending through the holder 15 centrally of the slot 18 is adapted to receive a handle rod 21 for sliding action therethrough. The end of the handle rod 21 is cut away as at 22 and has a securing means 23 for detachably receiving a knife or cutting member, here shown as a razor blade 24 thereon in an angular position so that the cutting edge 25 of the blade 24 will extend from the slot 18 into the slot 19. The handle rod 21 is provided with a grip 26 and the arm 15 is provided with a stop 27 preventing the blade 24 from being drawn out the end of the arm 15.

In operation the pressure arm 15 and handle rod 21 are raised and the papers that are to be cut are placed on the holder 11 between the ledges 12 and 14. The bar is hinged downwardly to the folded position as shown in Figs. 1 and 2, the pins 17 entering the pin holes in the table 11. The handle 26 is then grasped to slide along through the aligned slots 18 and 19, thereby cutting or halving any papers placed on the holder. As will be observed, the pressure bar 15 holds the papers on opposite sides of the slots 18 and 19, thus assuring that the papers will be held firmly to permit a smooth cutting action. After the cut is completed, the arm is raised and the papers on each side of the arm may be easily removed by grasping the same through the recesses 13.

It will be understood that the above description and accompanying drawing comprehend only the general and preferred embodiment of my invention and that various changes in construction, proportion and arrangement of parts may be made within the scope of the appended claims without sacrificing any of the advantages of my invention.

The invention described herein may be manufactured and used by or for the Government of the United States of America for governmental purposes without the payment of any royalties thereon.

I claim:

1. A paper cutter comprising a rectangular table, a pressure bar hinged to said table and adapted to fold across the width of said table, a slot in said pressure bar extending the length thereof, a rod adapted to extend through said slot, a knife blade detachably secured to one end of said rod and adapted to be moved through said slot by said rod, a slot in said table cooperating with the slot in said pressure rod, said knife blade being adapted to extend from said slot in said pressure bar to said slot in said table, a frame extending about three edges of said table and adapted to position a plurality of papers of predetermined size on said table, and a pair of recesses extending through the fourth edge of said table on opposite sides of said pressure bar.

2. A cutting device for halving papers of a predetermined size comprising a rectangular holder, a frame extending about three sides of said rectangular holder, a pair of indentations in the fourth side of said holder on opposite sides of the center thereof, an arm hinged to the side of the holder opposite said fourth side, a slot extending across the surface of said table below said arm, a slot extending through said arm adapted to be aligned with the slot in said holder when said arm is folded across said holder, an aperture extending through said arm and coinciding with said slot therethrough, a handle rod adapted to extend through said aperture in said arm, a razor blade detachably secured through one end of said arm in said slot at an angle thereto whereby one cutting end of said blade may extend below said arm into said aligned slot in said table and be drawn across said holder by said handle rod to cut the papers in the holder.

BERNARD KING.